UNITED STATES PATENT OFFICE.

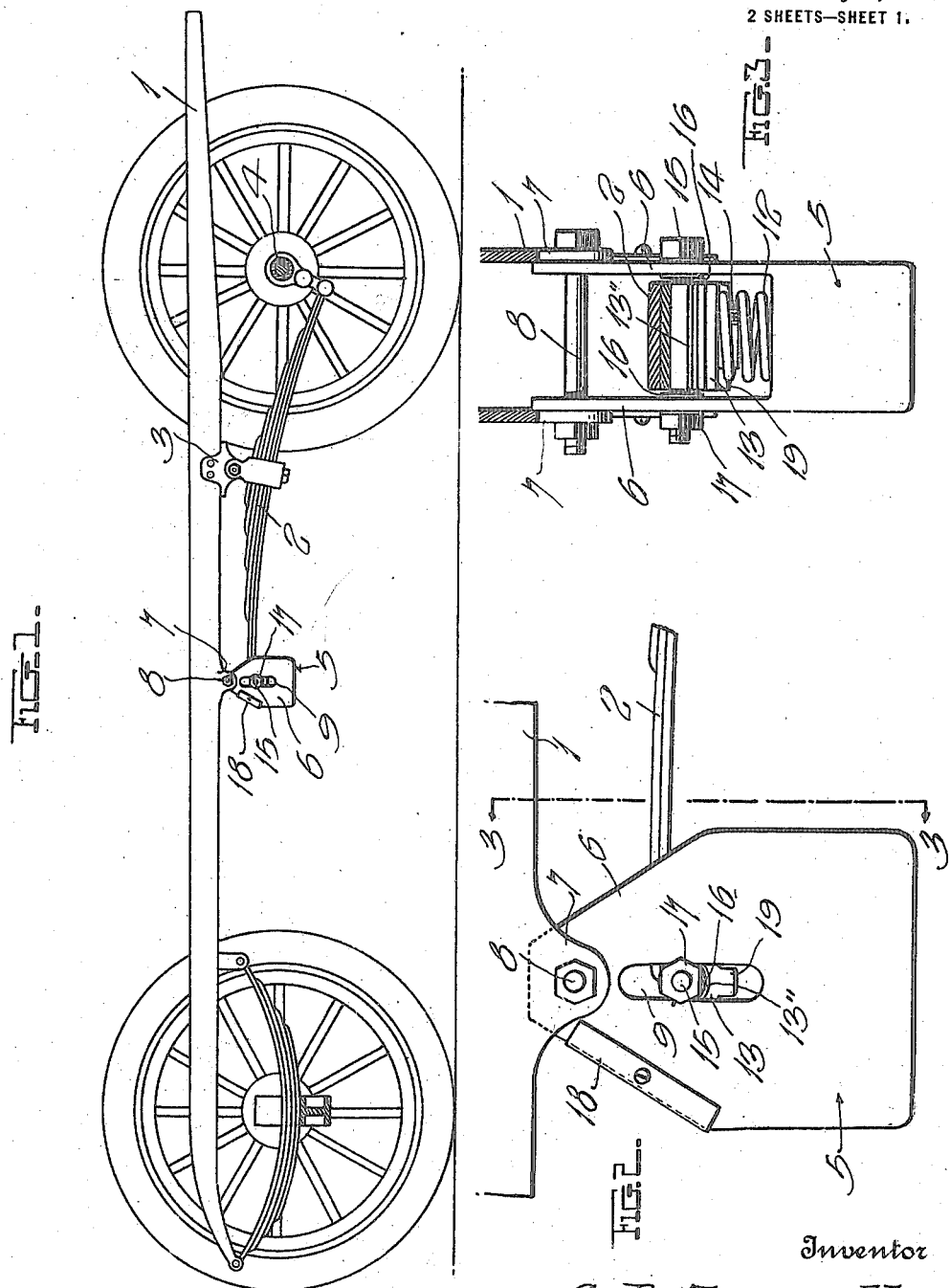

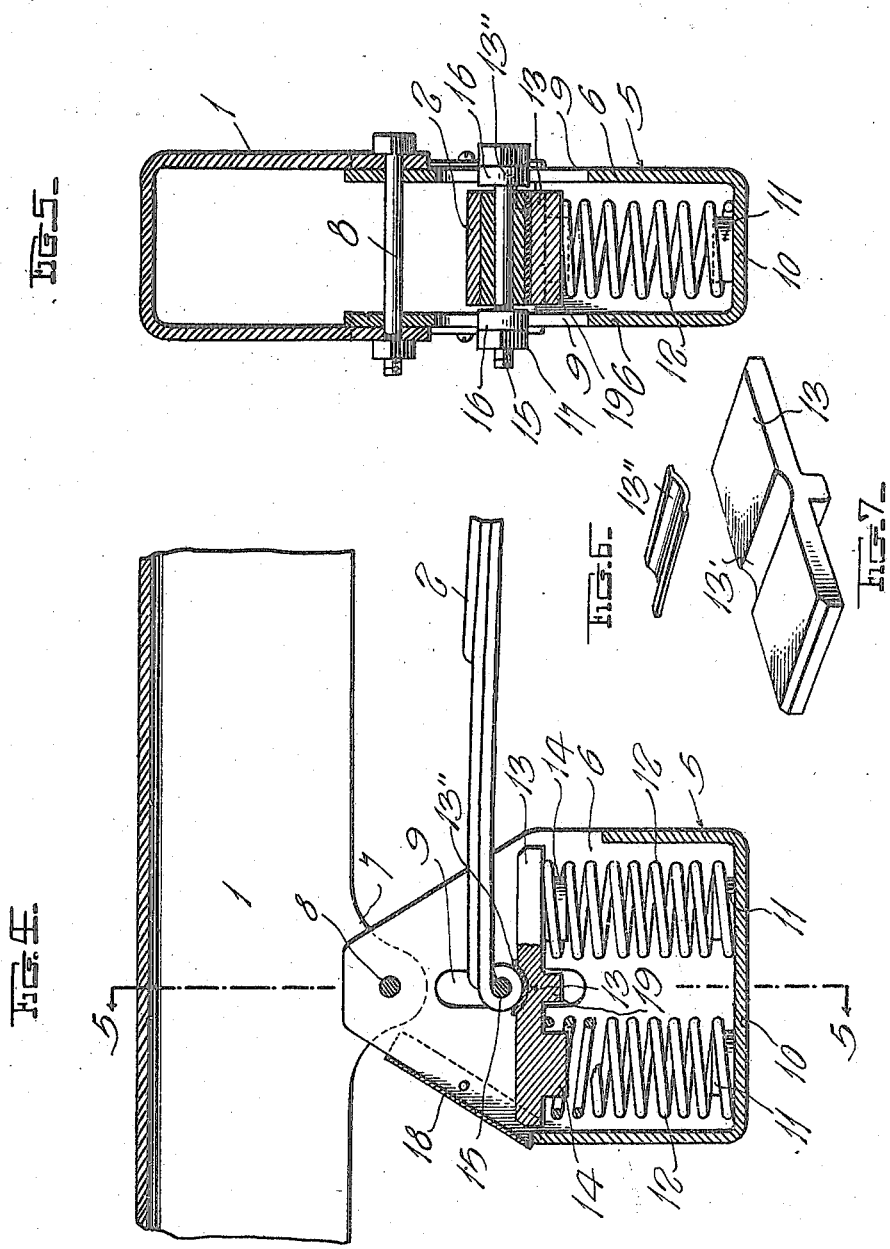

ARTHUR B. ZUMWALT, OF FULTON, CALIFORNIA.

SHOCK-ABSORBER FOR AUTOMOBILES.

1,265,021.   Specification of Letters Patent.   Patented May 7, 1918.

Application filed April 19, 1917. Serial No. 163,201.

*To all whom it may concern:*

Be it known that I, ARTHUR B. ZUMWALT, a citizen of the United States, residing at Fulton, in the county of Sonoma and State of California, have invented certain new and useful Improvements in Shock-Absorbers for Automobiles; and I do declare the following to be a full, clear, and exact description of the invention, such as will enable others skilled in the art to which it appertains to make and use the same.

This invention relates to improvements in shock absorbers for automobiles or the like, and is more particularly adapted for application to the front ends of cantaliver springs which are mounted on the rear end of the frames.

The objects of the invention are to provide a device of this character which is of simple and compact form for assisting the springs of an automobile or other vehicle to absorb the shock occasioned by impact of the wheels upon the obstructions of the roadway, such as stones and ruts, before shock is transmitted to the body of the vehicle.

With these and numerous other objects in view, my invention resides in the novel features of construction and in the combination and arrangement of the several parts as illustrated in the accompanying drawings and more particularly pointed out in the specification and claims.

In the accompanying drawings:—

Figure 1 is a side elevation of an automobile frame showing a cantaliver spring and my invention applied thereto;

Fig. 2 is an enlarged side elevation;

Fig. 3 is a transverse vertical section on the line 3—3 of Fig. 2;

Fig. 4 is a central vertical section;

Fig. 5 is a vertical transverse section on the line 5—5 of Fig. 4;

Fig. 6 is a detail perspective view of the wear plate; and

Fig. 7 is a similar view of the bearing block.

Similar numerals of reference are used to indicate corresponding parts throughout the several views. Reference is now had to the accompanying drawings in which the numeral 1 designates the rear end portion of one of the side bars of the frame of an automobile, and the numeral 2 one of the rear supporting cantaliver springs connected midway its length to depending ears on the side bar 3 and having its rear end connected in any suitable manner to the axle 4.

The shock absorber includes a substantially rectangular casing 5 formed from a single casting of any suitable material and having the major portion of its rear end open for a purpose which will be seen as the description progresses. The opposite side walls 6 of the casing have their upper ends converging upwardly and truncated as illustrated in the accompanying drawings. The front end wall of the casing extends upwardly to the point at which the side walls 6 begin to converge, thereby leaving an open space to permit assembling of the several parts.

At points adjacent the upper ends of the side walls 6 are a pair of transversely alined apertures which are adapted to be alined with the apertures in a second pair of depending ears 7 which are formed integrally with the side bars or made from a separate piece of material bolted or otherwise secured to said side bars, said alined apertures being adapted to receive therethrough a pivot bolt 8.

At a point below the alined apertures in the side walls are a pair of transversely alined vertically extending slots 9 for a purpose to be hereinafter set forth. The base 10 of the casing is preferably provided with a pair of upstanding lugs 11 adapted to project into the lower ends of a pair of vertically disposed coiled springs 12 on the upper ends of which a horizontally disposed rectangular block 13 is supported, said block having depending lugs 14 to be received in the upper ends of said coils, whereby the coils are held in relative spaced position.

The front end of the cantaliver spring 2 is provided with a transversely extending bolt 15 mounted thereon in any suitable manner, and having rotatably mounted adjacent its ends antifriction rollers 16 adapted to contact the side walls of the aforesaid vertical slots 9 and retained on said bolt by means of the head and the nut 17.

The block 13 is provided substantially midway its length and extending transversely across its upper face, with a groove 13′ in which is mounted a wear plate 13″ of brass or the like, and on which the forward end of the spring 2 is adapted to be supported. This wear plate, as is readily understood, is removable and may be replaced whenever it is worn out.

The block 13 is provided on its lower face midway its length and underlying the groove 13', with a transversely extending rib 19, whose purpose is to reinforce said block at the central point so that when the forward end of the spring 2 begins to wear the block said rib will prevent for an indefinite time the breaking of said block.

For the purpose of preventing dust and water from coming into contact with the working parts of the device, a substantially rectangular plate 18 is fastened to the transversely alined converging walls on the front end of the casing by having its opposite edges bent rearwardly and fastened by means of screws or the like.

In operation, the shock absorber being disposed as hereinbefore set forth, will materially decrease the jar ordinarily occasioned by the wheels striking obstacles or ruts in the roadway.

From the foregoing description, taken in connection with the accompanying drawings, the construction and operation of my improved shock absorber will be readily understood, but it is to be understood that within the scope of the appended claims, numerous changes may be made without sacrificing the principal advantages.

I claim:—

1. In a shock absorber, the combination with a support, of a casing having upstanding inverted substantially V-shaped side walls provided near their upper ends with a pair of transversely alined slots, said support having a portion received between said walls and pivoted thereto, said walls having therein a pair of transversely alined vertically extending slots, upstanding coiled springs in said casing supported on its base, a block supported on said springs and having a central transverse groove in its upper face, a spring having one end disposed in said groove, and a transversely extending bolt on said end having its ends vertically movable in the slots.

2. A shock absorber comprising a casing adapted to be pivotally connected to a support, the side walls of said casing being provided with a pair of transversely alined vertical slots, a pair of upstanding coiled springs in said casing, a block extending across and supported on the upper ends of said springs and having a central transverse groove in its upper face, a wear plate in said groove, a cantaliver spring having one end disposed on said plate, and a transversely extending bolt on said end, anti-friction rollers mounted on the ends of said bolt and vertically movable in said slots, and means for retaining the rollers on said bolt.

In testimony whereof I have hereunto set my hand in the presence of two subscribing witnesses.

ARTHUR B. ZUMWALT.

Witnesses:
JOHN T. CAMPBELL,
ROSS CAMPBELL.

Copies of this patent may be obtained for five cents each, by addressing the "Commissioner of Patents, Washington, D. C."